(12) United States Patent
Blom

(10) Patent No.: US 7,165,402 B2
(45) Date of Patent: Jan. 23, 2007

(54) COMBUSTION ENGINE

(75) Inventor: Christer Blom, Tumba (SE)

(73) Assignee: Saab Automobile AB (SE)

( * ) Notice: Subject to any disclaimer, the term of this patent is extended or adjusted under 35 U.S.C. 154(b) by 0 days.

(21) Appl. No.: 11/118,669

(22) Filed: Apr. 29, 2005

(65) Prior Publication Data

US 2005/0241307 A1 Nov. 3, 2005

(30) Foreign Application Priority Data

Apr. 29, 2004 (SE) .................... 0401106

(51) Int. Cl.
| | |
|---|---|
| F02B 33/44 | (2006.01) |
| F02B 37/00 | (2006.01) |
| F02B 37/02 | (2006.01) |
| F02B 39/00 | (2006.01) |
| F02B 67/10 | (2006.01) |
| F16M 11/00 | (2006.01) |
| F16M 11/04 | (2006.01) |

(52) U.S. Cl. ............... 60/605.3; 123/559.1; 248/674; 60/605.1

(58) Field of Classification Search ............. 123/605.3, 123/559.1, 195 R, 198 A, 605.1; 248/674
See application file for complete search history.

(56) References Cited

U.S. PATENT DOCUMENTS

| | | | | |
|---|---|---|---|---|
| 2,175,106 A | * | 10/1939 | Burns ................... | 123/566 |
| 2,810,514 A | * | 10/1957 | Patrick ................. | 415/213.1 |
| 4,483,147 A | * | 11/1984 | Evans et al. ............ | 60/611 |
| 4,583,367 A | * | 4/1986 | Kapfer et al. .......... | 60/605.3 |
| 4,697,782 A | * | 10/1987 | Ban ....................... | 248/674 |
| 4,716,735 A | * | 1/1988 | Ruf et al. .............. | 60/605.3 |
| 5,261,237 A | * | 11/1993 | Benson ................. | 60/605.1 |
| 5,392,751 A | * | 2/1995 | Matsubara et al. ..... | 123/559.1 |
| 5,938,169 A | * | 8/1999 | Ogawa et al. .......... | 248/674 |
| 6,305,168 B1 | * | 10/2001 | Furukawa ............. | 60/605.1 |
| 6,354,555 B1 | * | 3/2002 | Nishizuka et al. ..... | 248/674 |
| 6,378,309 B1 | * | 4/2002 | Divecha et al. ....... | 60/612 |
| 6,886,799 B1 | * | 5/2005 | Yamanashi ............ | 248/674 |
| 6,915,634 B1 | * | 7/2005 | Dumas et al. ......... | 60/605.3 |
| 2003/0005694 A1 | | 1/2003 | Pleuss et al. .......... | 60/605.3 |
| 2005/0028795 A1 | * | 2/2005 | Benson ................. | 123/559.1 |

FOREIGN PATENT DOCUMENTS

| | | | | |
|---|---|---|---|---|
| DD | 136281 A | * | 6/1979 | |
| DD | 156619 A | * | 9/1982 | |
| DD | 220792 A | * | 4/1985 | |
| DE | 3641550 C1 | * | 3/1988 | |
| EP | 1 176 301 | | 1/2002 | |
| FR | 2856736 A1 | * | 12/2004 | |
| JP | 62182433 A | * | 8/1987 | |
| JP | 2004197574 A | * | 7/2004 | |

* cited by examiner

*Primary Examiner*—Thai-Ba Trieu
(74) *Attorney, Agent, or Firm*—Ostrolenk, Faber, Gerb & Soffen, LLP

(57) ABSTRACT

A combustion engine for a vehicle comprising at least one exhaust gas collector for receiving the gases combusted in the engine, an exhaust gas driven turbo compressor for connection downstream the exhaust gas collector, and a mounting device for mounting the turbo compressor on the engine. The invention is characterised in that the mounting device comprises a suspension device arranged on the engine body for suspending the turbo compressor such that the weight of the turbo compressor is supported and that the turbo compressor after the suspension is connectable to the exhaust gas collector.

9 Claims, 2 Drawing Sheets

COMBUSTION ENGINE

TECHNICAL FIELD

The present invention relates to a combustion engine for a vehicle comprising at least one exhaust gas collector for receiving the gases combusted in the engine, an exhaust gas driven turbo compressor for connection downstream the exhaust gas collector, and a mounting device for mounting the turbo compressor on the engine.

The invention also relates to a method of mounting a turbo compressor on a combustion engine, which engine comprises at least one exhaust gas collector for receiving the gases combusted in the engine, an exhaust gas driven turbo compressor for connection downstream the exhaust gas collector and a mounting device for mounting the turbo compressor to the combustion engine.

BACKGROUND

In a supercharged combustion engine, the turbo compressor is normally mounted by tightening the flange of the turbine casing by screws to the exhaust gas collector. In addition to a screw joint holding the turbo compressor on place, the joint shall also seal against exhaust gas leakage. To accomplish this and to prevent cracks from arising in the exhaust gas collector, when the turbo compressor is suspended from it, a rod is normally required between the turbo compressor and the engine body for handling the often multidimensional load.

However, mounting the turbo compressor is not quit simple. An installer needs to hold the turbo compressor on place, at the same time as the flange is tightened to the exhaust gas collector. This is made more difficult since the turbo compressor is rather heavy, at the same time as the space surrounding the engine is narrow.

RELATED ART

US 2003/0005694 shows a turbo compressor which is tightened by screws to the exhaust gas collector. Mounting the turbo compressor implies that the installer holds the turbo compressor with one hand and with the other is tightening the screw joint.

EP 1 176 301 shows a turbo compressor which is tightened to the crankcase by screws. Special suspension devices are integrated in the crankcase for supporting a turbo compressor. Nevertheless, an installer has to hold the turbo compressor with one hand while the other is tightening the screw joint.

OBJECT OF THE INVENTION

An object of the invention is to reduce the risks for exhaust gas leakage in the joint between the exhaust gas collector and the turbo compressor.

Yet an object with the present invention is to simplify the work of an installer when mounting the turbo compressor.

SUMMARY OF THE INVENTION

These objects are achieved by means of a combustion engine as initially defined and which is characterised in that the mounting device comprises a suspension device arranged on the engine body for suspending the turbo compressor such that the weight of the turbo compressor is supported and that the turbo compressor after the suspension is connectable to the exhaust gas collector.

These objects are also achieved with a method as initially defined and which is characterised by the steps of first suspending the turbo compressor on the engine body by means of the mounting device such that the weight of the turbo compressor is supported, and thereafter connecting the turbo compressor to the exhaust gas collector.

Since the turbo compressor can be suspended from the engine body before it is connected to the exhaust gas collector mounting is simplified. The reason is that the suspension works as a "third hand" holding the turbo compressor, while the installer, which has his both hands free, can focus on the connection to the exhaust gas collector. Since the working environment often is narrow, unfavorable suspending situations as well as strain injuries can more easily be avoided. Furthermore, a compact installation is achieved since the turbo compressor is positioned closer to the engine body, which s advantageous since space often is lacking in the engine compartment of a vehicle. Neither, no extra rods are required so the number of mounting articles can be reduced.

An other advantage is that the exhaust gas collector is completely relieved from the weight of the turbo compressor, since the engine body supports it. This implies that the joint between the exhaust gas collector and the turbo compressor can be completely focused on sealing, since it does not have to take the weight of the turbo compressor into consideration. Moreover, the thermal stresses are reduced in the turbine casing at warm/cold cycling, since the casing is not required to be tightened in the same way as before. Consequently, the risks for exhaust gas leakage between the exhaust gas collector and the turbine inlet, and/or the formation of crack are reduced.

Since the exhaust gas collector is not loaded, it is also conceivable to use exhaust gas collectors made from sheet metal, which are not as load friendly as exhaust gas collectors made from cast iron. The reason why sheet metal is advantageous as material is that it makes it possible to use thinner thicknesses of material. This results in a lighter exhaust gas collector, which more quickly is heated by the exhaust gases. Thus, the catalytic converter will more quickly start to work, since it more rapidly will reach its working temperature, which in the future will be advantageous and necessary from an emission point of view.

Preferably, the suspension device comprises at least one suspension element and the turbo compressor comprises at least one hooking element, which element are adapted to form-closed interact for supporting the turbo compressor. Hereby, a joint which simplifies mounting and dismounting of the turbo compressor is achieved.

Suitably, the suspension element comprises a longitudinal, horizontal groove, in which the hooking element can be laterally moved. Hereby, it is possible to move the turbo compressor in the lateral direction, which promote a correct positioning of the turbo compressor.

Preferably, the suspension element comprises a stop element for restricting the lateral movement. Hereby, the positioning can be exact.

Preferably, the suspension element is integrated in the engine body. Hereby, the suspension device can be produced when casting the engine body, and separately arranged suspension devices will be redundant.

Suitably, the suspension device forms a separate part and is intended to be tightened to the engine body by means of a screw joint. Hereby, the suspension device can be arranged on arbitrary places on the engine body.

Preferably, the suspension device is made from cast iron. Hereby, a heat resistant material that will manage the high temperatures that may arise in the vicinity of the turbine is achieved. This facilitates mounting of the turbine e.g. on a cylinder head made from aluminum, which is far more heat sensitive than cast iron.

Suitably, the suspension device comprises elements intended to work as spacers between the engine body and the suspension device, Hereby, the heat transfer between the turbine and the engine body is suppressed, since an isolating air gap is formed between them, which is advantageous from a cooling point of view.

SHORT DESCRIPTION OF THE FIGURES

The invention will now be described with reference to accompanying figures, on which:

DESCRIPTION OF A PREFERRED EMBODIMENT OF THE INVENTION

Figure 1:
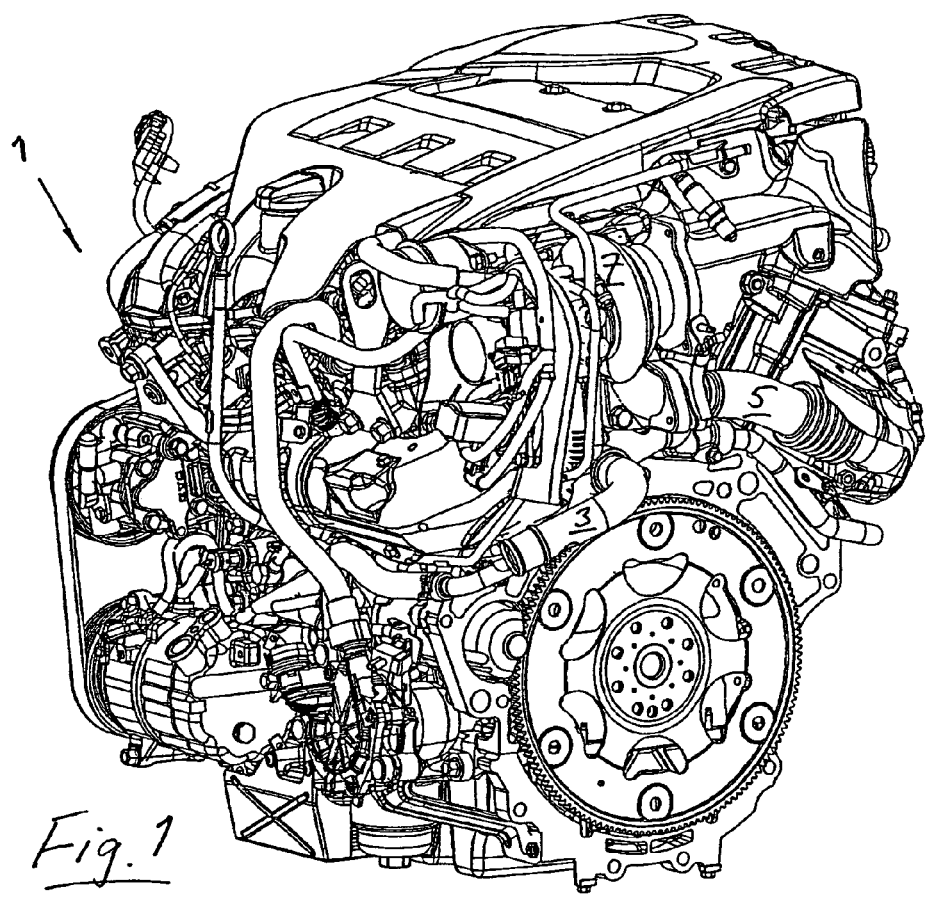
FIG. 1 shows a perspective view of a combustion engine with a turbo compressor according to the invention.

FIG. 1 shows a combustion engine 1 in the shape of a transverse V6 engine having 3 cylinders per bank, even though other numbers of cylinders are conceivable. The first cylinder bank leads exhaust gases to a first exhaust gas collector 3, and the second cylinder bank leads exhaust gases to a second exhaust gas collector 5. The first and the second exhaust gas collectors are separated and thus not in fluid communication with each other. The engine is moreover supercharged with the aid of an exhaust gas driven turbo compressor 7 having a turbine 9 and a compressor 11 driven by the turbine (see FIG. 2). The turbine 9 is of a so called twin-scroll model, which means that it has double spirally shaped inlets 13, 15 to the turbine wheel, but the invention is not restricted to such a model. The turbine inlets 13, 15 are coupled to a exhaust gas collector 3, 5, respectively. The advantage with a twin-scroll turbine is that the engine more quickly respond when pressing the throttle lever and becomes more fuel efficient. The turbo compressor 7 is mounted on the engine body by means of a not shown mounting device, which will be more thoroughly described below.

Figure 2:
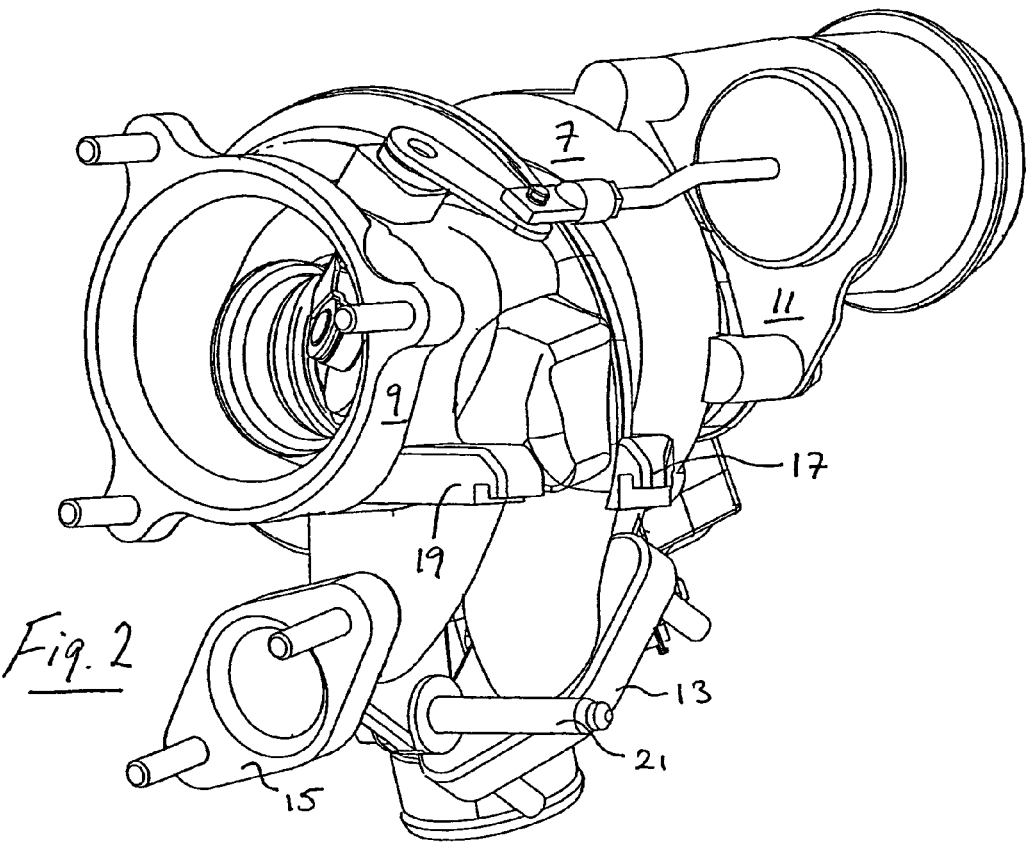
FIG. 2 shows a perspective view of the turbo compressor in FIG. 1.

FIG. 2 shows that the turbine housing 9 of the turbo compressor 7 is provided with two, substantially hook shaped hooking elements 17, 19, on the side of the turbine housing which after assembly is facing the engine body. These elements 17, 19 are formed directly in the castings and thus form an integrated part of the turbine housing. The hooking elements are arranged on a distance from each other and on substantially the same height. In the casting of the turbine housing, below the hooking elements, a bolt 21 is arranged for mounting of the turbo compressor on the engine body.

Figure 3:
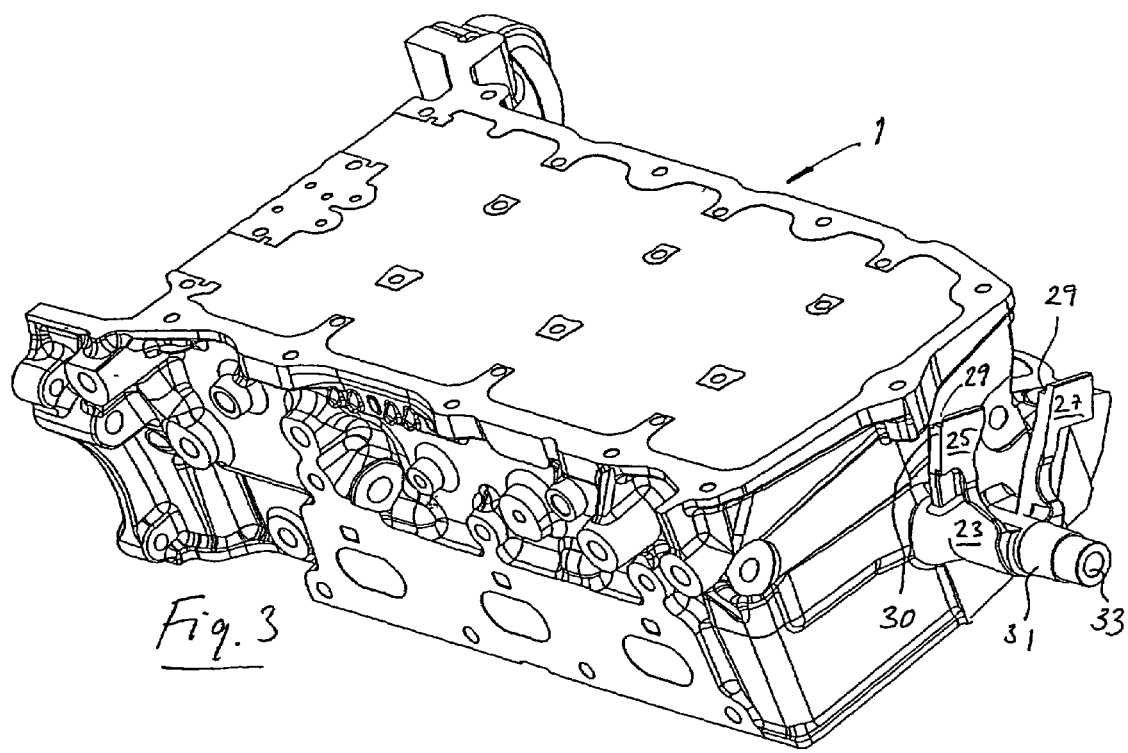
FIG. 3 shows a perspective view of a first embodiment of a suspension device.

FIG. 3 shows a close up view of the combustion engine in FIG. 1 with the cylinder head and the turbo compressor removed, so as to illustrate a first embodiment of a mounting device 23 according to the invention. It comprises a suspension device 23 in the form of two suspension elements 25, 27. These are formed directly in the engine body and thereby form an integrated part of it. The suspension elements 25, 27 are mutually arranged on substantially the same height. The distance between the suspension elements corresponds to the distance between the hooking elements 17, 19 of the turbine housing 9. Each suspension element 25, 27 comprises a cut out longitudinal groove 29 with a shape that substantially correspond to the appearance and dimension of the hooking elements 17, 19, whereby the hooking elements 17, 19 form-closed can interact with the suspension elements 25, 27. In each end of the groove, a small stop element 30 in the form of a boss 30 is disposed. Below the suspension elements, a spacer element 31 with a threaded hole 33 is disposed on the same distance from the suspension elements 25, 27 as the distance between the hooking elements 17, 19 and the bolt 21. By means of the spacer element 31 a space is formed between the turbo compressor 7 and the engine body which facilitates cooling.

The suspension elements 25, 27 and the hooking elements 17, 19 essentially form the mounting device 23. When mounting the turbo compressor on the engine body the turbo compressor 7 is simply hung on the engine body in that the hooking elements 17, 19 are hooked on the suspension elements 25, 27. On place, the hooking elements 17, 19 can slide in the grooves 29 of the suspension elements and the turbo compressor be positioned in the lateral direction so that the bolt 21 is aligned with the threaded hole 33. This occurs when one of the hooking elements 17, 19 abuts against the boss 30. The whole weight of the turbo compressor is now supported by the suspension elements 25, 27. In this position it is possible to connect the inlets of the turbo compressor to the exhaust gas collectors, whereby the exhaust gas collectors will not be loaded by the weight of the turbo compressor.

Figure 4:
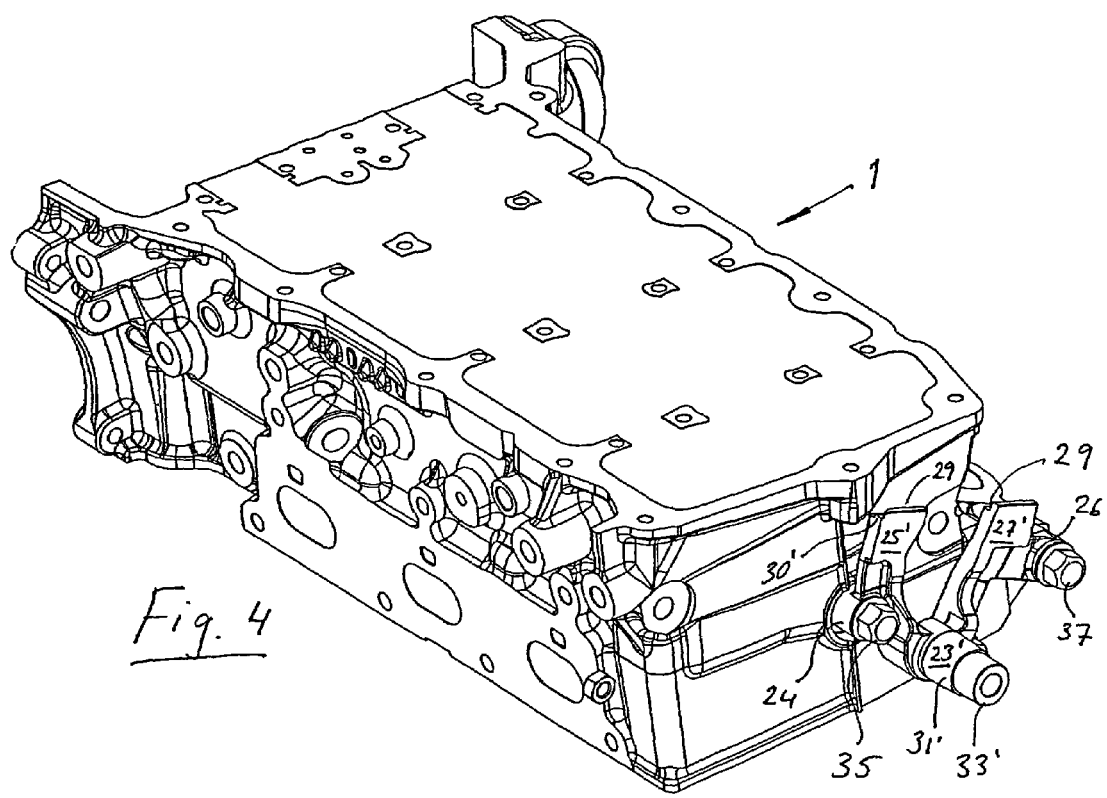
FIG. 4 shows a perspective view of a second embodiment of a suspension device.

FIG. 4 shows a close up view of the combustion engine in FIG. 1 with the cylinder head and the turbo compressor being removed so as to illustrate a second embodiment of a mounting device 23' according to the invention. In contrast to the first embodiment, this variant of the suspension device 23' forms a separate part for mounting on the engine body. The suspension device forms a bracket 23' and is produced from a heat resistant material, such as cast iron. The bracket 23' comprises two fastening portions 24, 26 provided with a through hole, respectively. The engine body is provided with two threaded bore holes with the same mutual position as the fastening portions 24, 26, whereby a corresponding bolt joint 35, 37 allows the bracket 23' to be firmly mounted on the engine body. The fastening portions 24, 26 also work as a spacer element, which means that a cooling gap is formed between the engine body and the bracket 23' after mounting.

Moreover, the mounting device according to this second embodiment is similar concerning function and appearance as the earlier described embodiment. Thus, the suspension device 23' comprises two suspension elements 25', 27', which are mutually arranged on substantially the same height. The distance between the suspension elements corresponds to the distance between the hooking elements 17, 19 of the turbine housing. Each suspension element 25', 27' comprises a cut out longitudinal groove 29' with a shape that substantially correspond to the shape and the appearance of the hooking elements, whereby the hooking elements 17, 19 form-closed can interact with the suspension elements 25', 27'. In each end of the groove a small stop element 30' in the shape of a boss 30' is arranged. Below the suspension elements a spacer element 31' with a threaded bore hole is arranged on the same distance from the suspension elements 25', 27' as the distance between the hooking elements 17, 19 and the bolt 21 in the turbine housing 9. By means of the spacer element 31' a space is formed between the turbo compressor 7 and the engine body which facilitates cooling.

The suspension elements 25', 27' and the hooking elements 17, 19 essentially form the mounting device 23'. When mounting the turbo compressor on the engine body the turbo compressor 7 is simply hung on the engine body in that the hooking elements 17, 19 are hooked on the suspension elements 25', 27'. On place the hooking elements 17, 19 can slide in the grooves 29 of the suspension elements and the turbo compressor be positioned in the lateral direction, so that the bolt 21 is aligned with the threaded hole 33 in the bracket. This occurs when one of the hooking elements 17, 19 abuts against the boss 30. The whole weight of the turbo compressor is now supported by the suspension elements 25', 27'. In this position it is possible to connect the inlets of the turbo compressor to the exhaust gas collectors, whereby the exhaust gas collectors will not be loaded by the weight of the turbo compressor. The advantage with this embodiment compared to the first embodiment described is that it provides for a worse heat transfer between the engine body and the turbo compressor, which may be of importance in case, e.g. the cylinder head is made from aluminum, and thereby has difficulties to resist the high temperatures that arise in the turbine. The bracket will then act as a spacer element distancing the turbine from the cylinder head so that a better cooling can be performed.

Of course it is also possible that the compressor housing is provided with the hooking elements and not only the turbine housing. It is also conceivable that the mounting of the turbo compressor takes place in the cylinder head.

The invention claimed is:

1. A method of mounting a turbo compressor on a combustion engine, wherein the engine comprises at least one exhaust gas collector for receiving the gases combusted in the engine, an exhaust gas driven turbo compressor for connection downstream the exhaust gas collector, and a mounting device for mounting the turbo compressor to the combustion engine;

the method comprising:

first suspending the turbo compressor on the engine body by means of the mounting device such that the weight of the turbo compressor is supported; and thereafter connecting the turbo compressor to the exhaust gas collector.

2. A combustion engine for a vehicle comprising:

at least one exhaust gas collector for receiving the gases combusted in the engine;

an exhaust gas driven turbo compressor for connection downstream from the exhaust gas collector; and a mounting device for mounting the turbo compressor on the engine, wherein the mounting device comprises:

a suspension device arranged on an engine body for suspending the turbo compressors such that the weight of the turbo compressor is supported and that the turbo compressor during the suspension is connectable to the exhaust gas collector.

3. The combustion engine according to claim 2, wherein the suspension device comprises at least one suspension element and the turbo compressor comprises at least one hooking element configured to couple with the at least one suspension element for suspending the turbo compressor.

4. The combustion engine according to claim 3, wherein the suspension element comprises a longitudinal, horizontal groove adapted to receive laterally 5. The combustion engine according to claim 4, wherein the comprises a stop element for restricting said lateral movement.

6. The combustion engine according to any of the previous claims, wherein the suspension device is integrated in the engine body.

7. The combustion engine according to claim 2, wherein the suspension device forms a separate part and is intended to be tightened to the engine body by means of a screw joint.

8. The combustion engine according to claim 7, wherein the suspension device is made from cast iron.

9. The combustion engine according to claim 8, wherein the suspension device comprises elements adapted to act as spacers between the engine body and the suspension device.

* * * * *